(12) United States Patent
Waldron et al.

(10) Patent No.: US 6,908,690 B2
(45) Date of Patent: Jun. 21, 2005

(54) METHOD AND APPARATUS FOR FRICTION STIR WELDING

(75) Inventors: Douglas J. Waldron, Fountain Valley, CA (US); Ray Miryekta, Huntington Beach, CA (US); Keith McTernan, Huntington Beach, CA (US)

(73) Assignee: The Boeing Company, Seattle, WA (US)

( * ) Notice: Subject to any disclaimer, the term of this patent is extended or adjusted under 35 U.S.C. 154(b) by 170 days.

(21) Appl. No.: 10/237,506

(22) Filed: Sep. 9, 2002

(65) Prior Publication Data

US 2003/0201307 A1 Oct. 30, 2003

Related U.S. Application Data

(60) Provisional application No. 60/376,758, filed on Apr. 29, 2002.

(51) Int. Cl.$^7$ .............................................. B23B 15/01
(52) U.S. Cl. ..................................... 428/615; 228/112.1
(58) Field of Search ..................... 156/73.5; 29/889.21; 228/112.1, 2.1; 428/615, 650

(56) References Cited

U.S. PATENT DOCUMENTS

| | | | |
|---|---|---|---|
| 5,460,317 A | * | 10/1995 | Thomas et al. .......... 228/112.1 |
| 5,611,479 A | | 3/1997 | Rosen |
| 5,697,544 A | | 12/1997 | Wykes |
| 5,794,835 A | * | 8/1998 | Colligan et al. ............. 228/2.1 |
| 6,053,391 A | * | 4/2000 | Heideman et al. ........... 228/2.1 |
| 6,070,784 A | | 6/2000 | Holt et al. |
| 6,199,745 B1 | | 3/2001 | Campbell et al. |
| 6,213,379 B1 | | 4/2001 | Takeshita et al. |
| 6,230,958 B1 | | 5/2001 | Coletta et al. |
| 6,247,634 B1 | | 6/2001 | Whitehouse |
| 2001/0038027 A1 | | 11/2001 | Coletta et al. |

FOREIGN PATENT DOCUMENTS

| | | |
|---|---|---|
| EP | 1 149 656 A2 | 10/2001 |
| GB | 2 306 366 | 5/1997 |
| JP | 11320127 | 11/1999 |
| WO | WO 99/52669 | 10/1999 |
| WO | WO 00/02699 | 1/2000 |
| WO | WO 01/17721 A1 | 3/2001 |

OTHER PUBLICATIONS

Tova et al., *Friction Stir Welding: An Innovative Seam Technology*, Welding International, 2003, vol. 17, No. 1, pps. 36–42, XP–001159236, no month.

* cited by examiner

*Primary Examiner*—Jonathan Johnson
(74) *Attorney, Agent, or Firm*—Alston & Bird LLP

(57) ABSTRACT

The present invention provides a tool for forming a friction stir weld joint in a workpiece. According to one embodiment, the tool includes a rotatable pin having first and second ends and defining a stirring portion therebetween structured to frictionally engage the workpiece so as to at least partially form the friction stir weld joint. The tool includes a rotatable first shoulder defining an aperture therethrough structured to slidably receive the first end of the pin. The tool also includes a second shoulder defining an aperture structured to receive the second end of the pin such that the pin extends between the first and second shoulders and such that the second shoulder is in rotatable communication with the pin. The first shoulder is structured to rotate independently of the pin and the second shoulder.

17 Claims, 14 Drawing Sheets

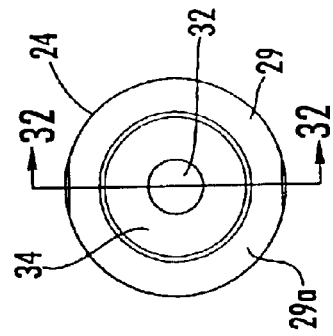
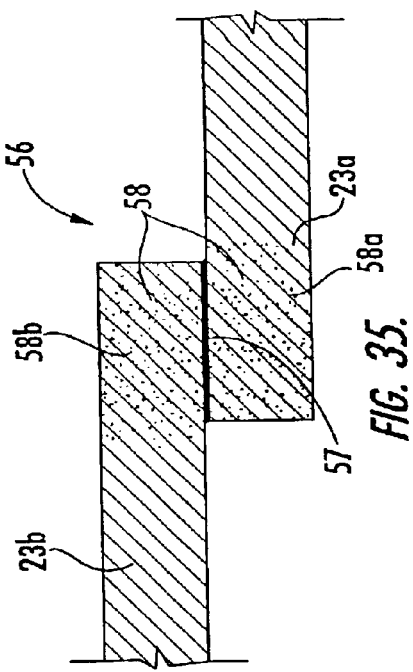
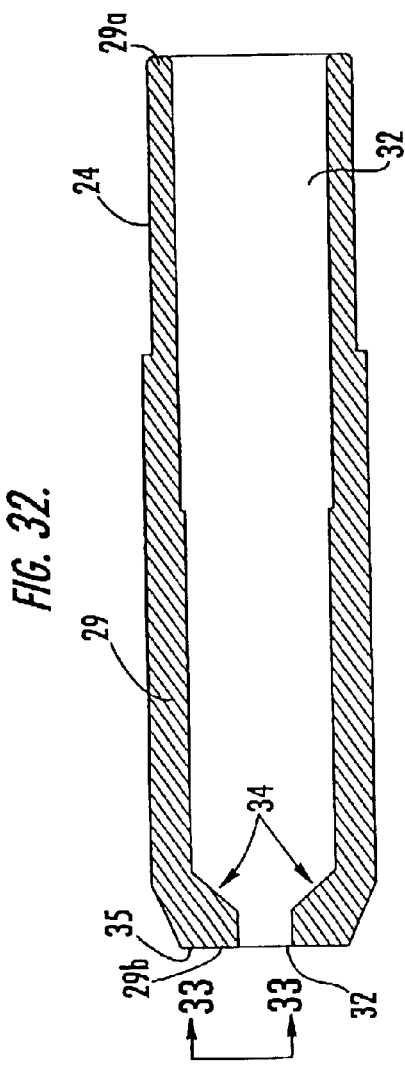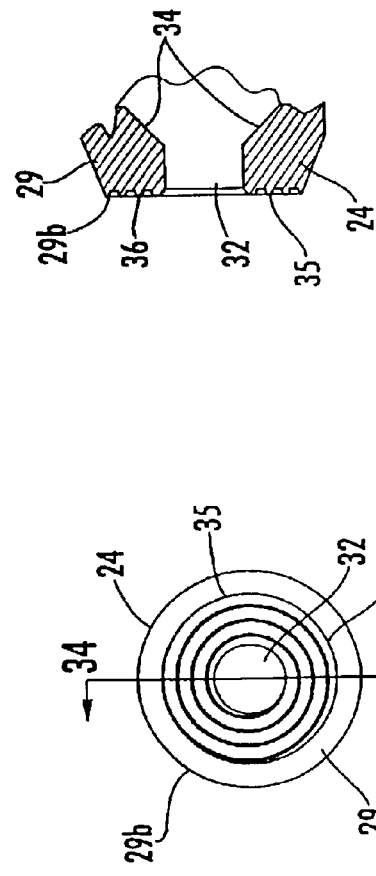

METHOD AND APPARATUS FOR FRICTION STIR WELDING

CROSS REFERENCE TO RELATED APPLICATIONS

This application claims the benefit of U.S. Provisional Application No. 60/376,758, filed Apr. 29, 2002.

BACKGROUND OF THE INVENTION

1. Field of the Invention

The present invention relates to friction welding and, more specifically, to backing up a weld joint during friction stir welding.

2. Description of Related Art

Friction stir welding is a relatively new process using a rotating tool, which includes a threaded pin or probe attached to a concave shoulder, to join in a solid state two workpieces or to repair cracks in a single workpiece. At present, the process is applied almost exclusively in straight-line welds. For example, such a process is described in U.S. Pat. No. 5,460,317 to Thomas et al., the contents of which are incorporated herein by reference. As shown in FIG. 1A, during friction stir welding, the probe 10 of the rotating tool 12 is plunged into a workpiece or between two workpieces 14 by a friction stir welding machine (not shown) to produce the required resistance force to generate sufficient frictional heating to form a region of plasticized material. As shown in FIG. 1B, the tool 12 is typically tilted approximately 3° relative to the workpiece or workpieces 14 such that the trailing edge of the concave shoulder 16 is thrust into and consolidates the plasticized material. Upon solidification of the plasticized material, the workpieces 14 are joined along the weld joint 18. The magnitude of force exerted by the friction stir welding tool 12 must be maintained above a prescribed minimum in order to generate the required frictional heating.

To prevent deformation of a workpiece by the force exerted by the friction stir welding tool 12 and maintain dimensional tolerances, the workpiece 14 must have support 15 behind the weld joint. Additionally, because the frictional heat generated by the welding tool plasticizes the material within the weld joint, the plasticized material must be constrained to prevent the material from flowing out of the weld joint and also must be consolidated to minimize porosity and provide a weld joint having the desired surface finish. When friction stir welding relatively flat workpieces, the weld joint can be supported by a continuous planar surface, such as a steel plate, positioned underneath the workpieces to be joined.

When friction stir welding large workpieces or workpieces having curvilinear geometries, providing adequate support to the weld joint becomes problematic because the amount of support material necessary and/or the curvilinear geometry makes it more difficult and expensive to provide a continuous support surface. Such welds are often necessary when fabricating military and commercial aircraft and rocket fuel tanks. In certain instances, a built-up structure, commonly referred to as "tooling," can be secured to the interior surfaces of the workpieces prior to friction stir welding. However, weight restrictions and/or design parameters often require a finished assembly having a smooth interior surface. As such, the tooling must be removed, for example, by machining, which is time consuming and labor intensive and increases the manufacturing cost of the finished assembly.

Another problem that has been encountered with friction stir welding occurs when joining workpieces formed of different materials having different material properties, such as solidus temperature, hardness, and/or thermal conductivity. The "solidus" temperature of a particular alloy is the temperature below which only a solid is stable. The different material properties can require that the friction stir welding tool be rotated within each workpiece at different rotational speeds and/or have different rates of tool advance through the workpieces, which can complicate the friction stir welding process and can limit the types of materials that can be joined. For example, when friction stir welding workpieces with different solidus temperatures, the friction stir welding tool will plasticize the workpiece with the lower solidus temperature first, such that the workpiece with the higher solidus temperature may not be sufficiently plasticized to be mixed with the other workpiece, as is necessary to form a strong weld joint.

Thus, there is a need for an improved friction stir welding tool for forming weld joints between large workpieces or workpieces having curvilinear geometries. The tool should be capable of effectively supporting a weld joint and constraining the plasticized material within the weld joint during friction stir welding and should be easily adaptable to varying workpiece geometries and sizes. In addition, the tool should allow for friction stir welding workpieces having different material properties.

SUMMARY OF THE INVENTION

The present invention provides a tool for forming a friction stir weld joint in a workpiece. According to one embodiment of the present invention, the tool includes a rotatable pin having first and second ends and defining a stirring portion therebetween structured to frictionally engage the workpiece so as to at least partially form the friction stir weld joint. The tool includes a rotatable first shoulder defining an aperture therethrough structured to slidably receive the first end of the pin. The tool also includes a second shoulder defining an aperture structured to receive the second end of the pin such that the pin extends between the first and second shoulders and such that the second shoulder is in rotatable communication with the pin. The first shoulder is structured to rotate independently of the pin and the second shoulder. In one embodiment, the first and second shoulders are structured to opposingly support the workpiece during friction stir welding. In another embodiment, the second shoulder defines a plurality of fins adapted to transfer heat away from the weld joint.

According to another embodiment of the present invention, the tool includes a rotatable pin having first and second ends and defining a stirring portion therebetween structured to frictionally engage the workpiece so as to at least partially form the friction stir weld joint. The tool includes a rotatable first shoulder defining an aperture therethrough structured to slidably receive the first end of the pin. The tool also includes a second shoulder defining an aperture structured to receive the second end of the pin such that the pin extends between the first and second shoulders and such that the second shoulder is in rotatable communication with the pin. At least one of the first and second shoulders has a surface defining at least one raised portion structured to frictionally engage the workpiece so as to at least partially form the friction stir weld joint. The first and second shoulders are structured to opposingly support the workpiece during friction stir welding. In one embodiment, the first shoulder is structured to rotate independently of the pin and the second shoulder. In another embodiment, the second shoulder defines a plurality of fins adapted to transfer heat away from the weld joint.

According to another embodiment of the present invention, the tool includes a rotatable pin having first and second ends and defining a stirring portion therebetween structured to frictionally engage the workpiece so as to at least partially form the friction stir weld joint. The tool includes a rotatable first shoulder defining an aperture therethrough structured to slidably receive the first end of the pin. The tool also includes a second shoulder defining an aperture structured to receive the second end of the pin such that the pin extends between the first and second shoulders and such that the second shoulder is in rotatable communication with the pin. The second shoulder defines a plurality of fins adapted to transfer heat away from the weld joint. In one embodiment, the first and second shoulders are structured to opposingly support the workpiece during friction stir welding. In another embodiment, the first shoulder is structured to rotate independently of the pin and the second shoulder.

The stirring portion of the pin can comprise a variety of configurations. For example, in one embodiment, the stirring portion of the pin defines at least one planar surface. In another embodiment, the stirring portion of the pin defines at least one threaded surface and at least one planar surface. In still another embodiment, the stirring portion of the pin comprises a first threaded surface having threads oriented in a first direction and a second threaded surface having threads oriented in a second direction, and wherein the first direction is different from the second direction.

The first and second shoulders each has a surface structured to frictionally engage the workpiece to thereby at least partially form the friction stir weld joint. For example, in one embodiment, at least one of the surfaces of the first and second shoulders is threaded. In another embodiment, at least one of the surfaces is convex. In still another embodiment, at least one of the surfaces is concave. In yet another embodiment, at least one of the surfaces defines at least one raised portion structured to frictionally engage the workpiece.

The pin can be connected to the second shoulder in a variety of different ways. For example, in one embodiment, at least a portion of the second end of the pin is threaded. Similarly, at least a portion of the aperture of the second shoulder is threaded so as to threadably receive the second end of the pin. In another embodiment, the second end of the pin has a polygonal configuration and the aperture of the second shoulder has a polygonal configuration corresponding to the configuration of the second end of the pin.

The present invention also provides an apparatus for forming a friction stir weld joint in a workpiece. According to one embodiment, the apparatus includes a machine having a spindle defining a rotatable inner portion and a rotatable outer portion. The apparatus includes a friction stir welding tool. In one embodiment, the friction stir welding tool includes a pin having first and second ends and defining a stirring portion therebetween structured to frictionally engage the workpiece so as to at least partially form the friction stir weld joint. The first end of the pin is in rotatable communication with the inner portion of the spindle. The friction stir welding tool includes a first shoulder defining an aperture therethrough structured to slidably receive the first end of the pin. The first shoulder is in rotatable communication with the outer portion of the spindle. The friction stir welding tool also includes a second shoulder defining an aperture structured to receive the second end of the pin such that the pin extends between the first and second shoulders and such that the second shoulder is in rotatable communication with the pin. The first shoulder is structured to rotate independently of the pin and the second shoulder. As described above, many variations and modifications of the friction stir welding tool and first and second shoulders are possible.

The present invention also provides a method of friction stir welding a workpiece. According to one embodiment of the present invention, the method comprises positioning first and second shoulders adjacent the workpiece. Each of the first and second shoulders has a surface structured to frictionally engage the workpiece. A pin is connected to the first and second shoulders so that the pin extends therebetween. The pin defines a stirring portion structured to frictionally engage the workpiece. Thereafter, the first shoulder is rotated at a first angular velocity and the pin and the second shoulder are rotated at a second angular velocity different from the first angular velocity so that at least a portion of each of the pin, first shoulder, and second shoulder frictionally engages the workpiece to thereby form a friction stir weld joint. The stirring portion of the pin can be moved through the workpiece along a predetermined path.

According to another embodiment of the present invention, the method includes positioning first and second shoulders adjacent the workpiece. Each of the first and second shoulders has a surface structured to frictionally engage the workpiece. A pin is connected to the first and second shoulders so that the pin extends therebetween. The pin defines a stirring portion structured to frictionally engage the workpiece. The first shoulder is rotated. Concurrently with the first rotating step, the pin and the second shoulder are rotated independently of the first shoulder so that at least a portion of each of the pin, first shoulder, and second shoulder frictionally engages the workpiece to thereby form a friction stir weld joint. For example, the first and second rotating steps can include rotating the first shoulder at a first angular velocity and the pin and the second shoulder at a second angular velocity; wherein the second angular velocity is different from the first angular velocity. As used herein, "angular velocity" includes both a speed component and a direction component. The direction component is positive for motion following the "right hand rule," i.e., counter-clockwise motion, and is negative for motion in the opposite direction, i.e., clockwise motion. The stirring portion of the pin can be moved through the workpiece along a predetermined path.

The method of connecting the pin to the first and second shoulders can be varied. In one embodiment, the connecting step comprises sliding an end of the pin through an aperture in the first shoulder. The connecting step can then include threading an end of the pin into a threaded aperture defined by the second shoulder.

In another embodiment, the connecting step comprises drilling an aperture in the workpiece. An end of the pin is slid through an aperture in the first shoulder. The end of the pin is then inserted through the aperture in the workpiece and connected to the second shoulder.

The position of the first and second shoulders relative to one another can be modified in order to adjust the force exerted by the shoulders on the workpiece. For example, in one embodiment, the pin is urged toward the first shoulder so as to urge the second shoulder toward the first shoulder. In another embodiment, the first shoulder is urged toward the second shoulder.

The present invention also provides a friction stir weld lap joint being formed by a rotating friction stir welding tool.

The lap joint includes a first structural member and a second structural member. The second structural member at least partially overlaps the first structural member so as to define an interface therebetween. The lap joint includes a friction stir weld joint joining the first and second structural members at least partially at the interface. The friction stir weld joint defines first and second portions. The first portion of the friction stir weld joint is mixed by the friction stir weld tool at a first angular velocity and the second portion of the friction stir weld joint is mixed by the friction stir welding tool at a second angular velocity to thereby form grain structures of different refinement in the first and second portions. In one embodiment, the first and second structural members comprise different materials. In another embodiment, the first and second structural members have different solidus temperatures. In yet another embodiment, the first and second structural members have different hardness.

Thus, there has been provided a friction stir welding tool, apparatus and associated method of manufacture for forming weld joints by friction stir welding large workpieces or workpieces having curvilinear geometries. The tool is capable of effectively supporting a weld joint and constraining the plasticized material within the weld joint during friction stir welding. The tool can easily be adapted to varying workpiece geometries and sizes. In addition, the tool allows for friction stir welding workpieces having different material properties.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein:

FIG. 31 is an elevation view illustrating the end of the first shoulder of the friction stir welding tool defining an aperture for slidably receiving the pin, according to another embodiment of the present invention;

FIG. 32 is a sectional view illustrating the first shoulder shown in FIG. 31 along line 32—32;

FIG. 33 is an elevation view illustrating the end of the first shoulder shown in FIG. 32 along line 33—33 structured for frictionally engaging a workpiece;

FIG. 34 is a partial sectional view illustrating the end of the first shoulder shown in FIG. 33 along line 34—34;

FIG. 35 is an elevation view of a friction stir weld lap joint, according to one embodiment of the present invention;

DETAILED DESCRIPTION OF THE INVENTION

Figure 2A:
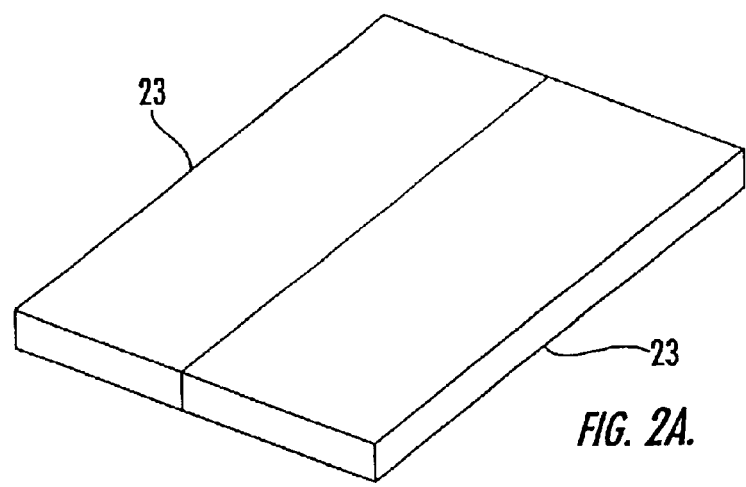
FIG. 2A is a perspective view illustrating the positioning of two workpieces to form an interface therebetween prior to friction stir welding, according to one embodiment of the present invention.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout Referring now to the drawings and, in particular, to FIG. 2B, there is shown a friction stir welding device or apparatus 20, according to one embodiment of the present invention, for friction stir welding a workpiece or workpieces 23, such as the workpieces 23 shown in FIG. 2A. The friction stir welding device 20 of the present invention is particularly suited for friction stir welding large workpieces and workpieces having curvilinear geometries. The friction stir welding device 20 includes a friction stir welding tool 22 and a device or machine (not shown) structured for rotating a friction stir welding tool, such as a milling machine or drill having a spindle 21 that preferably includes independently rotatable and axially translatable outer and inner portions 21a, 21b. The outer and inner portions 21a, 21b of the spindle 21 preferably can be translated axially independent of one another. The device or machine structured for rotating the friction stir welding tool 22 can be operated manually, but preferably is operated by a computer, microprocessor, microcontroller or the like operating under software control. According to one embodiment, the device or machine structured for rotating the friction stir welding tool 22 includes a 55UA bobbin tool weld machine manufactured by ESAB.

Figure 3:
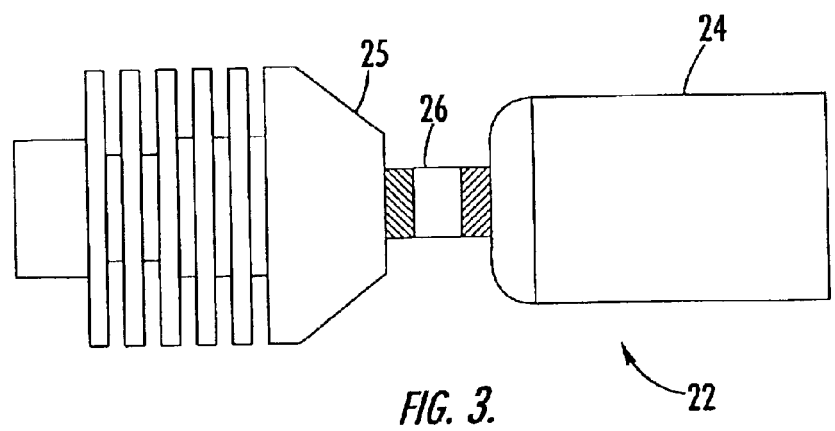
FIG. 3 is an elevation view illustrating a friction stir welding tool, according to one embodiment of the present invention.

As illustrated in FIG. 3, the friction stir welding tool 22 includes a first shoulder 24, a second shoulder 25, and a pin 26 extending therebetween. Referring to FIGS. 27–34, the first shoulder 24 can be formed in a variety of configurations, but preferably is cylindrical in shape. The first shoulder 24 has a body 29 defining an aperture 32 extending the length of the first shoulder. The body 29 of the first shoulder 24 preferably is formed of a material having high strength and heat resistance. For purposes of example only and not limitation, the body 29 of the first shoulder 24 can be constructed of tool steel, a molybdenum alloy, such as TZM, and nickel alloys, such as Rene 41 (UNS N07041). The first end 29a of the body 29 of the first shoulder 24 is structured to be in rotatable communication with the outer rotatable portion 21a of the spindle 21 so that the first shoulder is in rotatable communication with the spindle. For example, the outer rotatable portion 21a of the spindle 21 can include a conventional chuck or collet (not shown) that engages the exterior of the body 29 of the first shoulder 24. In another embodiment (not shown), the aperture 32 of the first shoulder 24 defines a threaded portion at the first end 29a that is structured to threadably engage a corresponding threaded portion extending from, or defined by, the outer rotatable portion 21a of the spindle 21. In yet another embodiment (not shown), the exterior of the body 29 of the first shoulder 24 defines a threaded portion at the first end 29a that is structured to threadably engage a corresponding threaded portion defined by the outer rotatable portion 21a of the spindle 21.

Figure 28:
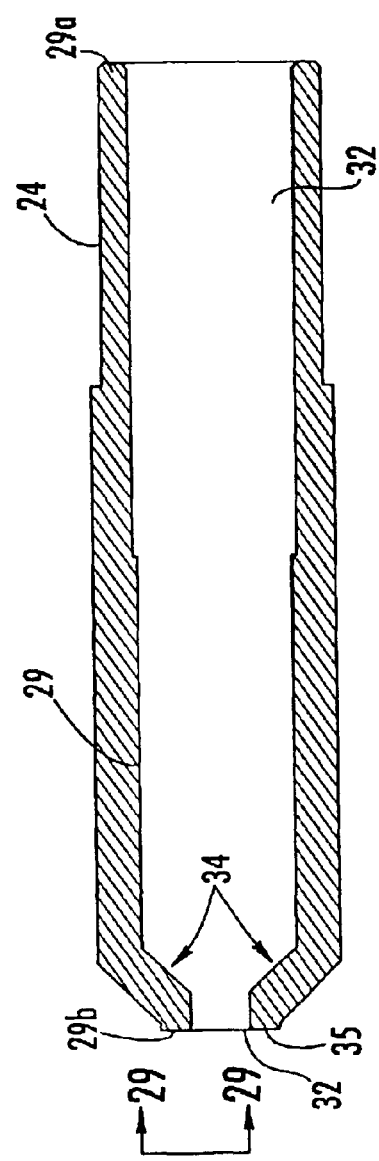
FIG. 28 is a sectional view illustrating the first shoulder shown in FIG. 27 along line 28—28.
Figure 30:
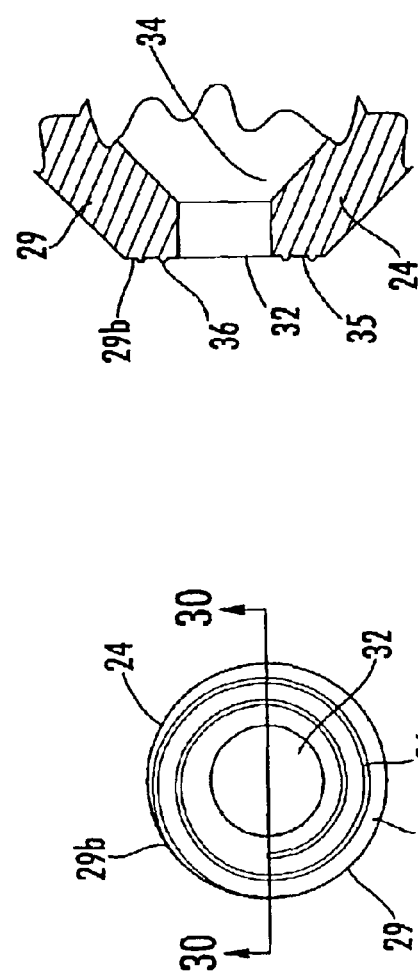
FIG. 30 is a partial sectional view illustrating the end of the first shoulder shown in FIG. 29 along line 30—30.

As illustrated in FIGS. 28 and 32, the diameter of the aperture 32 of the first shoulder 32 is larger at the first end 29a of the body 29 than at the second end 29b of the body. More specifically, the diameter of the aperture 32 gradually tapers from the first end 29a to the second end 29b of the first shoulder 24 until just before the second end 29b of the first shoulder where the aperture 32 exhibits a relatively sharp decrease in diameter. The sharp decrease in diameter of the aperture 32 of the first shoulder 24 defines an angled interior surface 34 proximate to and surrounding the aperture 32 at the second end 29b of the first shoulder.

Figure 1A:
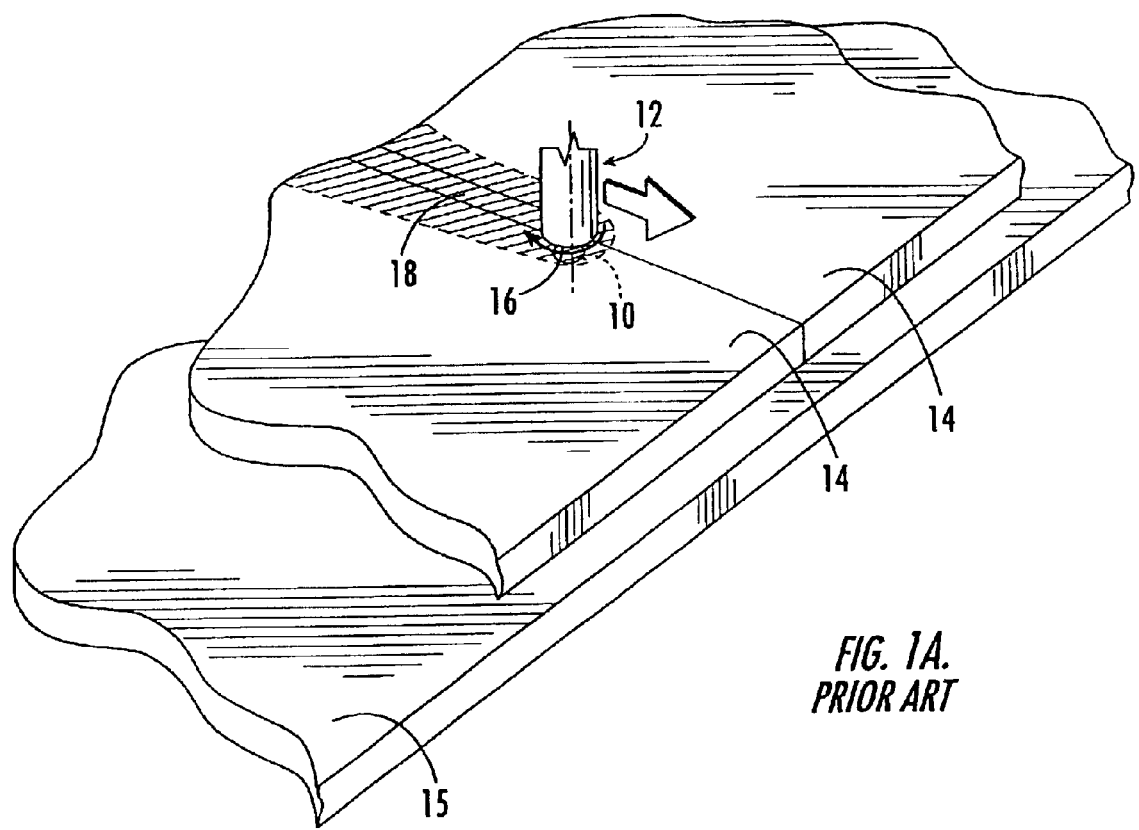
FIG. 1A is a partial perspective view of a conventional friction stir welding tool, illustrating the positioning of the shoulder and probe during friction stir welding.
Figure 1B:
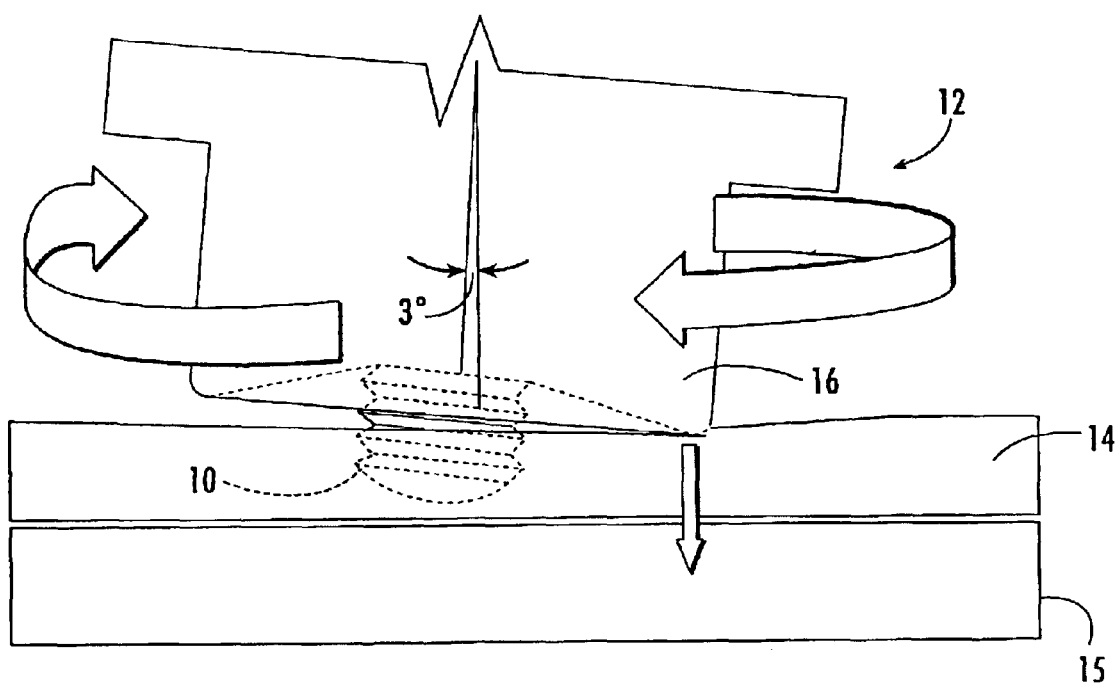
FIG. 1B is a cross-sectional view of a conventional friction stir welding tool, illustrating the positioning of the shoulder and probe during friction stir welding.
Figure 2B:
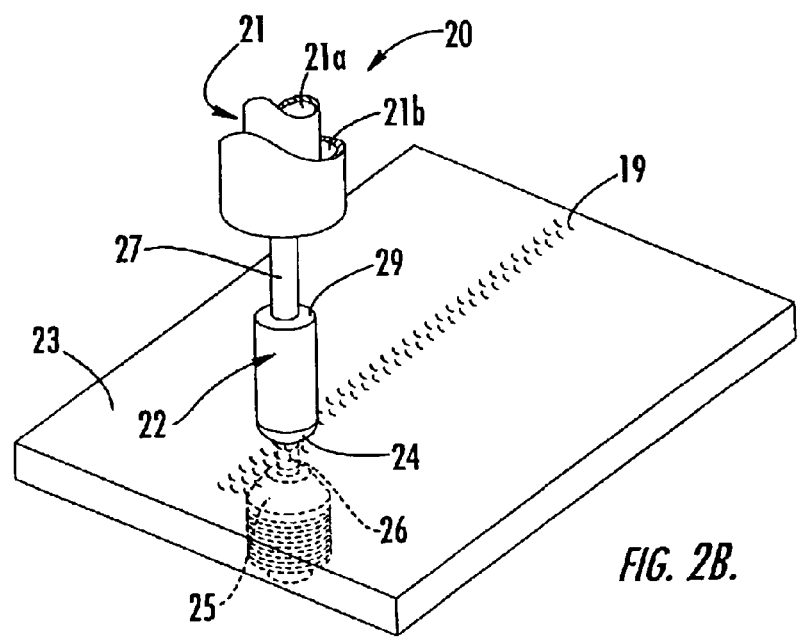
FIG. 2B is a perspective view illustrating a structural assembly being formed by friction stir welding the two workpieces shown in FIG. 2A, according to one embodiment of the present invention.
Figure 29:
FIG. 29 is an elevation view illustrating the end of the first shoulder shown in FIG. 28 along line 29—29 structured for frictionally engaging a workpiece.

As illustrated in FIGS. 29, 30, 33 and 34, the second end 29b of the first shoulder 24, which is adjacent the workpiece 23 in FIG. 2B, has a surface 35 structured to frictionally engage the workpiece to thereby at least partially form the friction stir weld joint 19. For example, in one embodiment, as illustrated in FIGS. 29 and 33, the surface 35 is threaded 36. In another embodiment (not shown), the surface 35 has a convex configuration. In still another embodiment, the surface 35 has a concave configuration, similar to the shoulder 16 illustrated in FIG. 1B, to capture and consolidate the plasticized material in the weld joint 19. In yet another embodiment, the surface 35 defines one or more raised portions or surfaces, such as threads 36, bumps, or ribs, structured to frictionally engage the workpiece 23. In yet another embodiment, the surface 35 has a relatively flat or planar configuration.

Figure 4:
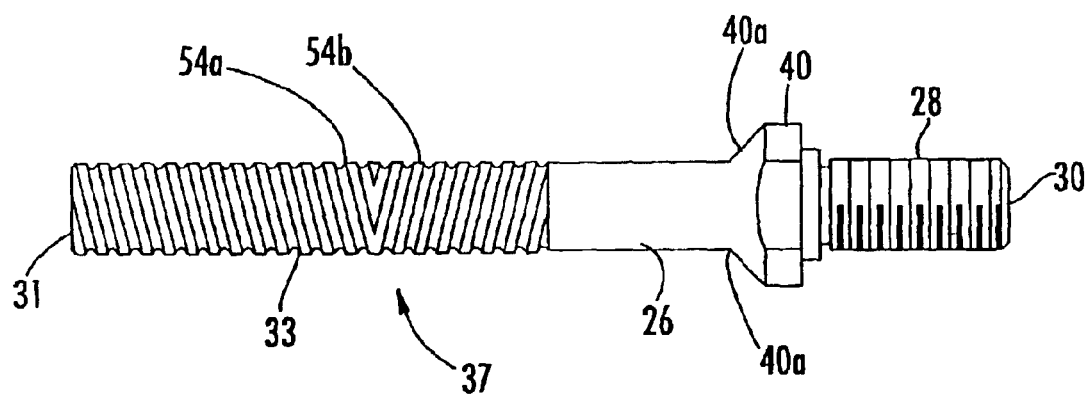
FIG. 4 is an elevation view illustrating a pin for a friction stir welding tool, according to one embodiment of the present invention.
Figure 5:
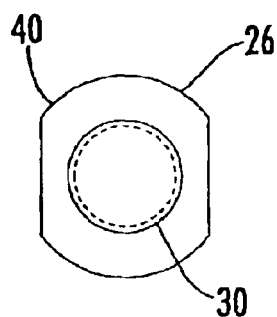
FIG. 5 is an elevation view illustrating one end of the pin shown in FIG. 4.
Figure 6:
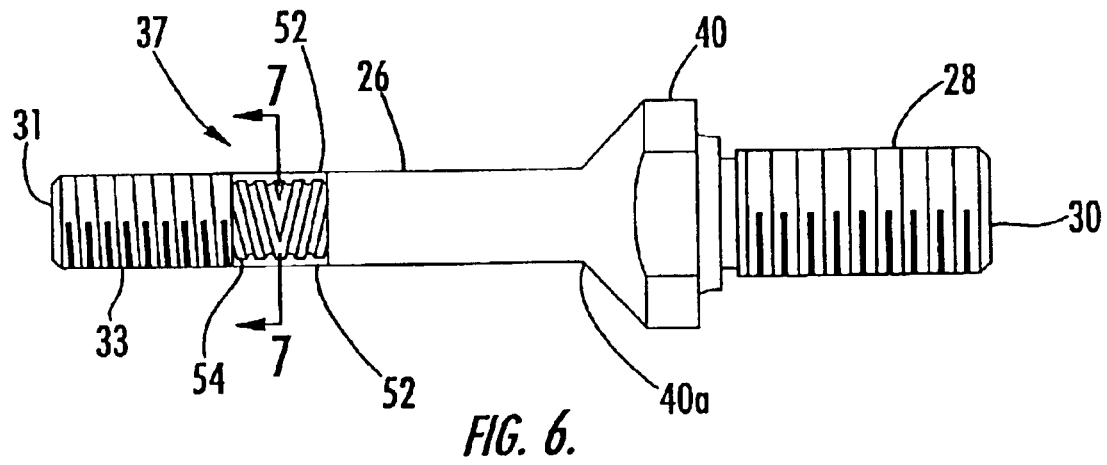
FIG. 6 is an elevation view illustrating a pin for a friction stir welding tool, according to another embodiment of the present invention.
Figure 7:
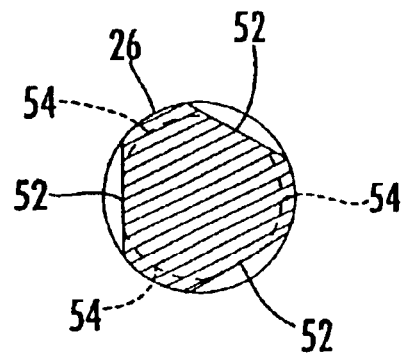
FIG. 7 is a sectional view illustrating the pin shown in FIG. 6 along line 7—7.
Figure 8:
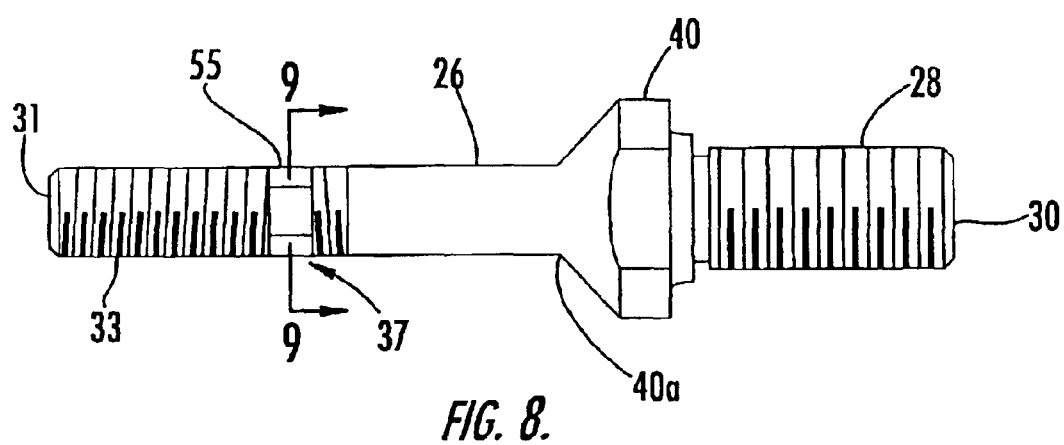
FIG. 8 is an elevation view illustrating a pin for a friction stir welding tool, according to another embodiment of the present invention.
Figure 9:
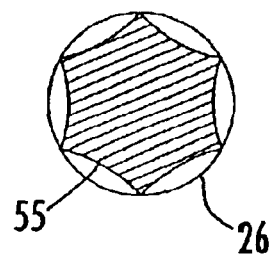
FIG. 9 is a sectional view illustrating the pin shown in FIG. 8 along line 9—9.
Figure 10:
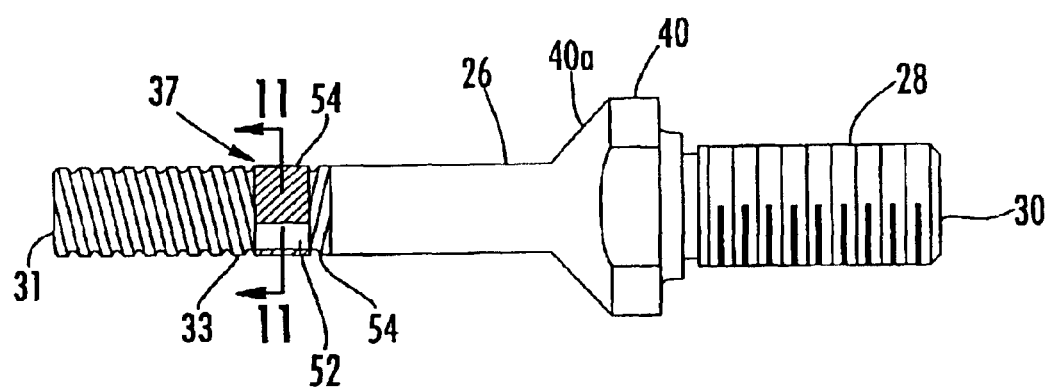
FIG. 10 is an elevation view illustrating a pin for a friction stir welding tool, according to another embodiment of the present invention.
Figure 11:
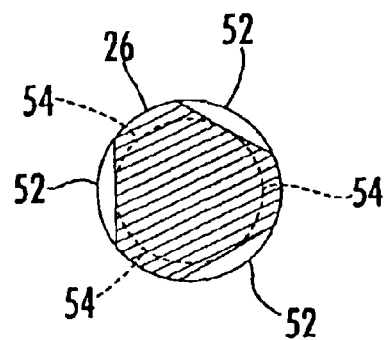
FIG. 11 is a sectional view illustrating the pin shown in FIG. 10 along line 11—11.
Figure 14:
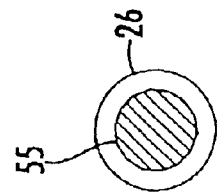
FIG. 14 is a sectional view illustrating the pin shown in FIG. 12 along line 14—14.
Figure 17:
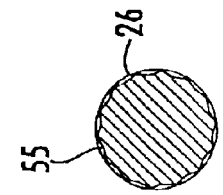
FIG. 17 is a sectional view illustrating the pin shown in FIG. 15 along line 17—17.
Figure 12:
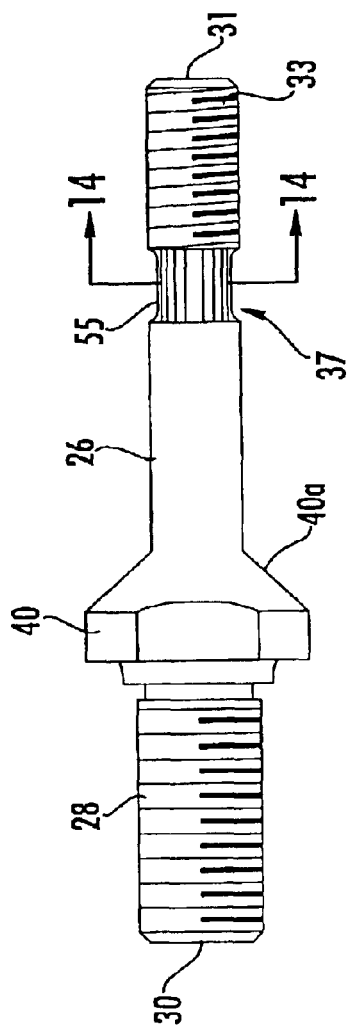
FIG. 12 is an elevation view illustrating a pin for a friction stir welding tool, according to another embodiment of the present invention.
Figure 15:
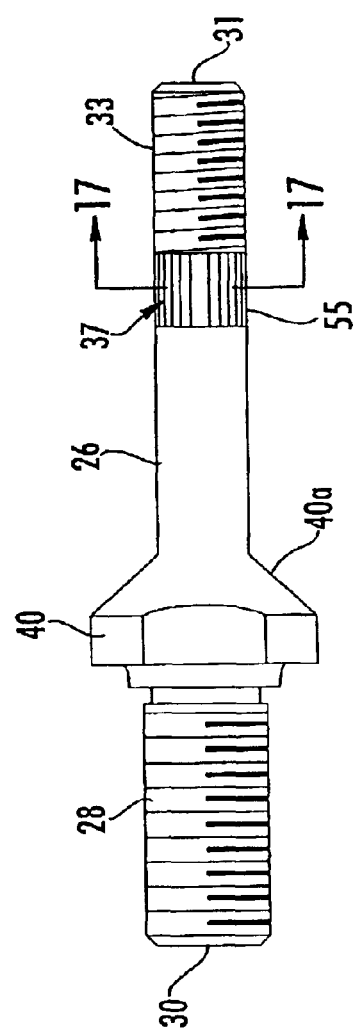
FIG. 15 is an elevation view illustrating a pin for a friction stir welding tool, according to another embodiment of the present invention.
Figure 13:
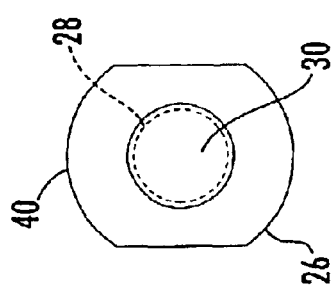
FIG. 13 is an elevation view illustrating one end of the pin shown in FIG. 12.
Figure 16:
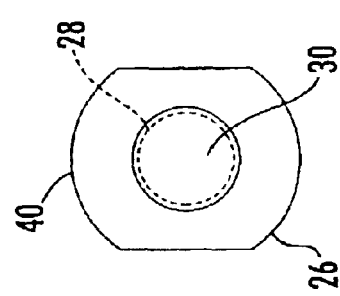
FIG. 16 is an elevation view illustrating one end of the pin shown in FIG. 15.
Figure 18:
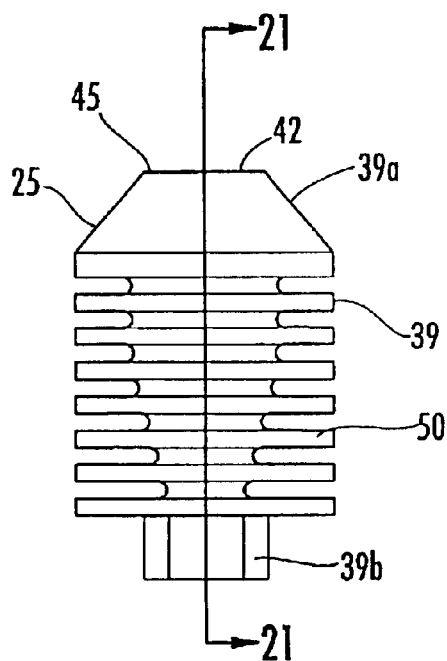
FIG. 18 is an elevation view illustrating the second shoulder of a friction stir welding tool, according to one embodiment of the present invention.

Referring to FIGS. 4–17, the pin 26 has first and second ends 30, 31 and a stirring portion 37 positioned along the length of the pin between the first and second ends. The pin 26 preferably is formed of a material having high strength and heat resistance. For purposes of example only and not limitation, the pin 26 can be constructed of tool steel, a molybdenum alloy, such as TZM, and nickel alloys, such as Rene 41 (NS N07041). As illustrated in FIGS. 4 and 5, the first end 30 of the pin 26 preferably defines a threaded portion 28, which as illustrated in FIG. 2B, is structured to threadably engage a corresponding threaded aperture (not shown) within the adapter or shaft 27 that extends from the pin 28 to the inner rotatable portion 21b of the spindle 21 so that the pin is in rotatable communication with the spindle. In another embodiment (not shown), the first end 30 of the pin 26 is of sufficient length to connect directly to the inner rotatable portion 21b of the spindle 21 using a threaded connection or a conventional chuck or collet (not shown).

Referring to FIGS. 4 and 5, the first end 30 of the pin 26 defines a protuberance 40 adjacent the threaded portion 28 of the pin. Comparing FIG. 4 to FIGS. 28 and 32, the protuberance 40 includes an angled exterior surface 40a having a relatively sharp decrease in diameter which corresponds generally to the angled interior surface 34 defined by the aperture 32 of the first shoulder 24 at the second end 29b of the body 29. The dimensions of the pin 26 and protuberance 40 are such that the second end 31 of the pin and the protuberance will slide through the aperture 32 of the first shoulder 24 from the first end 29a to the second end 29b until the exterior surface 40a of the protuberance rests against the angled interior surface 34 defined by the aperture 32. In this position, the second end 31 of the pin 26 extends from the second end 29b of the first shoulder 24 through the aperture 32 defined therein. The pin 26 and protuberance 40 preferably are free to rotate within the aperture 32 of the first shoulder 24. The angled interior surface 34 of the first shoulder 24 preferably is machined to a fine finish, which, in combination with the thickness of the body 29 of the first shoulder, acts as a bearing between the contact surfaces of the pin 26 and the first shoulder 24 to reduce friction therebetween. The thickness of the body 29 of the first shoulder 24 preferably is about 0.375 inches or more.

Referring to FIGS. 4, 6, 7, 8, 9, 10, 11, 12, 14, 15, and 17, the pin 26 has a stirring portion 37 that can be configured in a variety of configurations depending on the dimensions and material properties of the workpiece 14. For example, in one embodiment, as illustrated in FIGS. 6, 7, 10 and 11, the stirring portion 37 of the pin 26 defines one or more planar surfaces 52. In another embodiment, as illustrated in FIGS. 6, 7, 10 and 11, the stirring portion 37 of the pin 26 defines at least one threaded surface 54 and at least one planar surface 52. In another embodiment, as illustrated in FIG. 4, the stirring portion 37 of the pin 26 comprises a first threaded surface 54a having threads oriented in a first direction and a second threaded surface 54b having threads oriented in a second direction, and wherein the first direction is different from the second direction. In yet another embodiment, as illustrated in FIGS. 8, 9, 12, and 15, the stirring portion 37 of the pin 26 comprises a plurality of concave surfaces 55.

Figure 21:
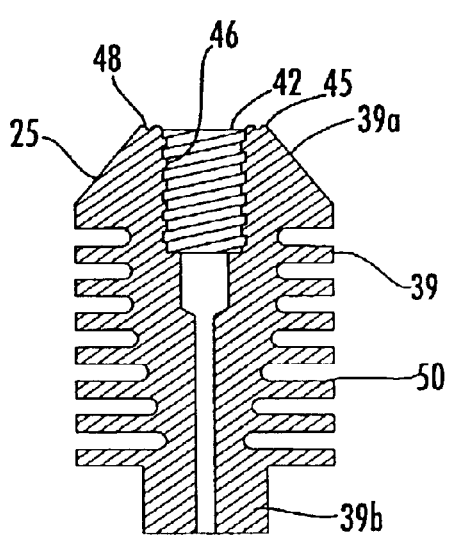
FIG. 21 is a sectional view illustrating the second shoulder shown in FIG. 18 along line 21—21.
Figure 22:
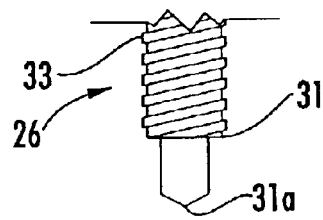
FIG. 22 is a partial elevation view illustrating the end of a pin of the friction stir welding tool structured for connecting to the second shoulder, according to one embodiment of the present invention.
Figure 23:
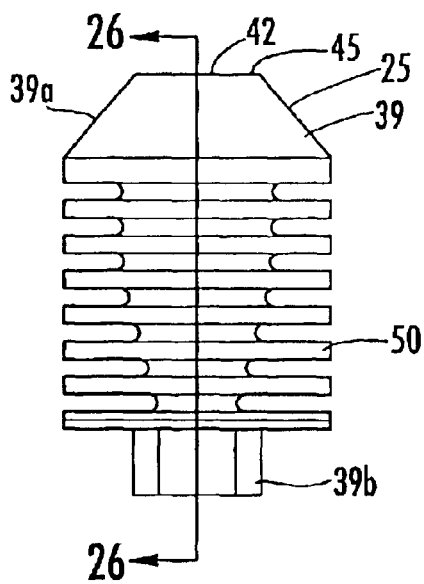
FIG. 23 is an elevation view illustrating the second shoulder of a friction stir welding tool, according to another embodiment of the present invention.
Figure 26:
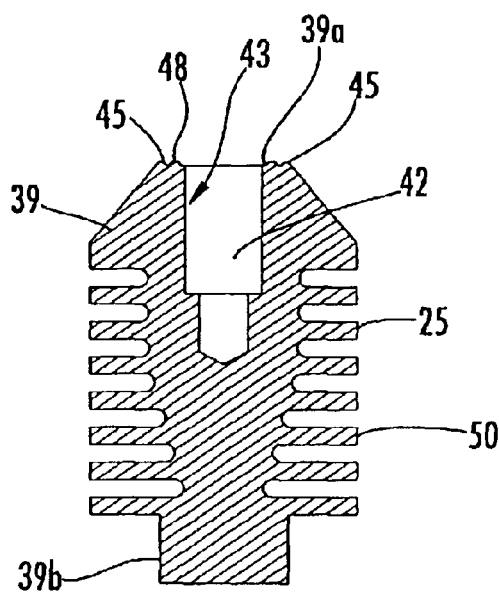
FIG. 26 is a sectional view illustrating the second shoulder shown in FIG. 23 along line 26—26.
Figure 27:
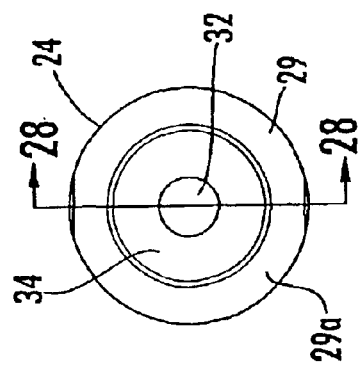
FIG. 27 is an elevation view illustrating the end of the first shoulder of the friction stir welding tool defining an aperture for slidably receiving the pin, according to one embodiment of the present invention.

Referring to FIGS. 18–21 and 23–26, the second shoulder 25 can be formed in a variety of configurations, but preferably is cylindrical in shape. The second shoulder 25 has a body 39 defining an aperture 42 at least at the first end 39a thereof. The body 39 of the second shoulder 25 preferably is formed of a material having high strength and heat resistance, and high thermal conductivity. For purposes of example only and not limitation, the body 39 of the second shoulder 25 can be constructed of tool steel, a molybdenum alloy, such as TZM, and nickel alloys, such as Rene 41 (UNS N07041). The first end 39a of the body 39 of the second shoulder 25 is structured to be in rotatable communication with second end 31 of the pin 26 and, thus, the inner rotatable portion 21b of the spindle 21. For example, as illustrated in FIGS. 21 and 22, the second end 31 of the pin 26 can be threaded 33 and the aperture 42 of the body 39 of the second shoulder 25 can be threaded 46 such that the second end of the pin is threadably received within the aperture 42. Alternatively, as illustrated in FIG. 26, the second end 31 of the pin 26 can define a polygonal surface (not shown) and the aperture 42 of the body 39 of the second shoulder 25 can define a corresponding polygonal configuration 43 so that the second end 31 of the pin 26 is matingly received within the aperture 42. A mechanical fastener (not shown), such as a cotter pin or setscrew, can be used to secure the second end 31 of the pin 26 within the aperture 42 of the second shoulder 25. As illustrated in FIGS. 21, 22, and 26, the aperture 42 defined by the body 39 of the second shoulder 25 can be configured to receive the tip 31a of the second end 31 of the pin 26. As illustrated in FIGS. 21 and 26, the aperture 42 can extend through the entire length of the body 39 of the second shoulder 25 from the fist end 39a to the second end 39b or only a portion thereof.

As illustrated in FIGS. 18, 21, 23, and 26, the body 39 of the second shoulder 25 preferably defines one or more fins 50 structured to transfer heat away from the weld joint 19. The fins 50 can be particularly advantageous when friction stir welding workpieces 23 formed of different materials in which one workpiece has a lower solidus temperature than the other. The fins 50 transfer heat away from the workpiece adjacent the second shoulder 25, which has the lower solidus temperature, thereby lowering the temperature of the workpiece below the temperature of the workpiece adjacent the first shoulder 24, which has the higher solidus temperature. In another embodiment (not shown), the fins 50 are formed on the first shoulder 24, instead of the second shoulder 26, and the workpiece having the lower solidus temperature is positioned adjacent the first shoulder.

Figure 19:
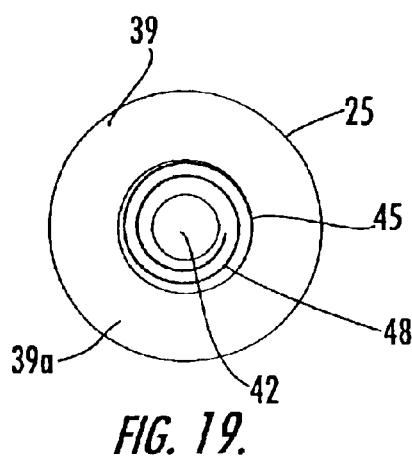
FIG. 19 is a plan view illustrating the end of the second shoulder shown in FIG. 18 structured for frictionally engaging a workpiece.
Figure 20:
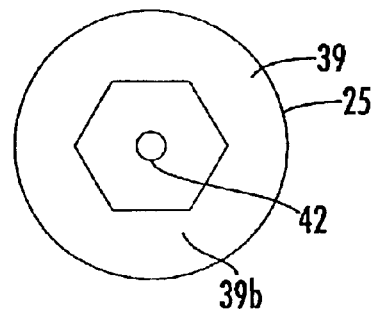
FIG. 20 is a bottom view illustrating the second shoulder shown in FIG. 18.
Figure 24:
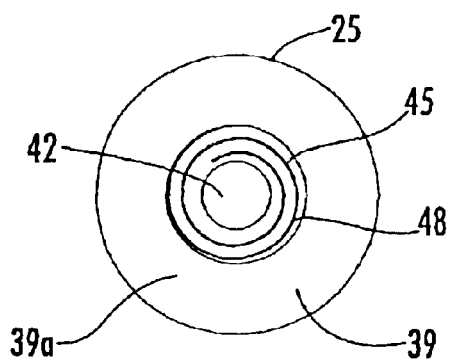
FIG. 24 is a plan view illustrating the end of the second shoulder shown in FIG. 23 structured for frictionally engaging a workpiece.
Figure 25:
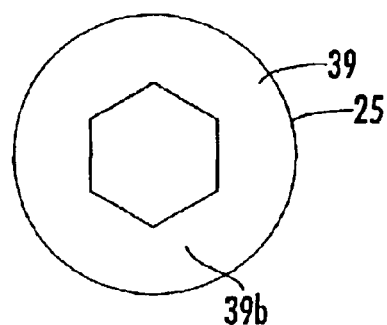
FIG. 25 is a bottom view illustrating the second shoulder shown in FIG. 23.

As illustrated in FIGS. 19, 21, 24 and 26, the first end 39a of the body 39 of the second shoulder 25, which is adjacent the workpiece 23 in FIG. 2B, has a surface 45 structured to frictionally engage the workpiece to thereby at least partially form the friction stir weld joint 19. For example, in one embodiment, as illustrated in FIGS. 19 and 24, the surface 45 is threaded 48. In another embodiment (not shown), the surface 45 has a convex configuration. In still another embodiment, the surface 45 has a concave configuration, similar to the shoulder 16 illustrated in FIG. 1B, to capture and consolidate the plasticized material in the weld joint 19. In yet another embodiment, the surface 45 defines one or more raised portions or surfaces, such as threads 48, bumps, or ribs, structured to frictionally engage the workpiece 23. In yet another embodiment, the surface 45 has a relatively flat or planar configuration.

Prior to operation of the friction stir welding device 20, the friction stir welding tool 22 is secured to the spindle 21. According to one embodiment, the first end 30 of the pin 26 is first attached to the inner portion 21b of the spindle 21. For example, the first end 30 of the pin 26 and the inner portion 21b of the spindle 21 can include mating threads, or the inner portion 21b of the spindle can include a conventional chuck or collet. The second end 31 of the pin 26 is then inserted through the aperture 32 defined by the first end 29a of the body 29 of the first shoulder 24 so that the second end 31 of the pin extends through the aperture 32 at the second end 29b of the body 29 of the first shoulder. The first shoulder 24 is attached to the outer portion 21a of the spindle 21. For example, the first shoulder 24 and the outer portion 21a of the spindle 21 can include mating threads, or the outer portion 21a of the spindle can include a conventional chuck or collet. The second end 32 of the pin 26 is then inserted into, and secured within, the aperture 42 defined by the second shoulder 25. For example, the second end 32 of the pin 26 and the aperture 42 of the second shoulder 25 can include mating threads, or the second end 32 of the pin and the aperture 42 of the second shoulder can define corresponding male and female polygonal configurations. A mechanical fastener (not shown), such as a conventional cotter pin or setscrew, can be inserted into the second shoulder 25 to secure the second end 32 of the pin 26 within the aperture 42. In another embodiment, an aperture (not shown) structured to receive the second end 32 of the pin 26 can be premachined into the workpiece or workpieces 23, in which case the second end 32 of the pin is inserted through the aperture and then attached to the second shoulder 25.

Once the friction stir welding tool 22 is attached to the spindle 21, a friction stir weld joint 19 is formed. According to one embodiment of the present invention, the outer portion 21a of the spindle 21 is rotated to thereby rotate the first shoulder 24 and the inner portion 21b of the spindle is rotated to thereby rotate the pin 26 and the second shoulder 26. The spindle 21 preferably is structured such that the speed and direction of rotation, i.e., the "angular velocity", of the outer portion 21a and the inner portion 21b can be varied independently of one another. For example, the outer portion 21a of the spindle 21 can rotate the first shoulder 24 in the same direction and speed of rotation as the inner portion 21b of the spindle 21 rotates the pin 26 and second shoulder 25. Alternatively, the outer portion 21a of the spindle 21 can rotate the first shoulder 24 at a different speed and/or direction than the inner portion 21b of the spindle 21 rotates the pin 26 and second shoulder 25.

In order to form a friction stir weld joint 19, the rotating friction stir welding tool 22 is moved into contact with the workpiece or workpieces 23 so that the rotating surfaces 35, 45 of the first and second shoulders 24, 25, respectfully, and the stirring portion 37 of the pin 26 frictionally engage the workpiece or workpieces. The rotating friction stir welding tool 22 preferably is moved through the workpiece or workpieces along a predetermined path to thereby form an elongate weld joint. During friction stir welding, the portions of the workpiece or workpieces 23 proximate to the pin 26 are "sandwiched" between the first shoulder 24 and the second shoulder 25. Advantageously, the force exerted by the surfaces 35, 45 of the first and second shoulders 24, 25 compresses the workpiece or workpieces 23 about the pin 26 creating a seal that prevents the plasticized material from being extruded.

According to one embodiment of the present invention (not shown), the device or machine structured for rotating the friction stir welding tool 22 can be structured to rotate and axially translate the first shoulder 24 or the combined pin 26 and second shoulder 25, or both, relative to one another in response to changes in the magnitude of the force exerted by the first shoulder and/or second shoulder on the workpiece(s) 23 and the weld joint 19. For example, the friction stir weld device 20 can include means for measuring the magnitude of the force exerted by the first and/or second shoulder 24, 25 upon the workpiece(s) 23 and the weld joint 19. The means for measuring the magnitude of the force can include a computer, a microprocessor, a microcontroller or the like operating under software control, which is in electrical communication with at least one sensor. The sensor can include a strain-gage load cell, a piezoelectric load cell, a dynamometer, a pneumatic load cell, or a hydraulic load cell that is positioned on a workpiece 23, the first shoulder 24, and/or the second shoulder 25.

During operation, measurements from the at least one sensor are periodically transmitted or communicated to the computer, microprocessor, or microcontroller through suitable electrical or optical wiring. The computer, microprocessor, or microcontroller then compares the magnitude of the force measured by the sensor to a predetermined value. If the magnitude of the force communicated from the sensor differs from the predetermined value, then the computer, microprocessor, microcontroller transmits a signal to the device or machine structured friction stir welding tool 22 instructing the device or machine to modify the force exerted by the first shoulder 24 and the second shoulder 25 on the workpiece(s) 23 and the weld joint 19. This process can be repeated based on subsequent measurements transmitted by the sensor to the computer, microprocessor, or microcontroller until the magnitude of the force is equal to, or approximates, the predetermined value.

As discussed above, the device or machine structured for rotating the friction stir welding tool 22 can include a 55UA bobbin tool weld machine manufactured by ESAB, which includes a spindle 21 having an outer portion 21a, which is structured for rotating and axially translating the first shoulder 24, and an inner portion 21b, which is structured for rotating and axially translating the pin 26 and the second shoulder 25. The device or machine can be operated manually or automatically by connecting the device or machine, using suitable electrical or optical wiring (not shown), to a computer, microprocessor, microcontroller or the like operating under software control.

If the magnitude of the force communicated from the sensor is less than the predetermined value, then the computer, microprocessor, or microcontroller transmits a signal to the device or machine structured for rotating the friction stir welding tool 22 instructing the device or machine to increase the force exerted by the first and second shoulders 24, 25 on the workpiece(s) 23 and the weld joint 19. For example, the force on the workpiece(s) 23 and the weld joint 19 can be increased by urging the pin 26 and the second shoulder 25 toward the first shoulder 24 by axially translating the inner portion 21b of the spindle 21 in a direction away from the first end 29a of the body 29 of the first shoulder. Alternatively or simultaneously, the force on the workpiece(s) 23 can be increased by urging the first shoulder 24 toward the second shoulder 25 by axially translating the outer portion 21a of the spindle 21 in a direction toward the second shoulder.

If the magnitude of the force communicated from the sensor is more than the predetermined value, then the computer, microprocessor, or microcontroller tnansmits a signal to the device or machine structured for rotating the friction stir welding tool 22 instructing the device or machine to decrease the force exerted by the first and second shoulders 24, 25 on the workpiece(s) 23 and the weld joint 19. For example, the force on the workpiece(s) 23 and the weld joint 19 can be decreased by urging the pin 26 and the second shoulder 25 away from the first shoulder 24 by axially translating the inner portion 21b of the spindle 21 in a direction toward the first end 29a of the body 29 of the first shoulder. Alternatively or simultaneously, the force on the workpiece(s) 23 and the weld joint 19 can be decreased by urging the first shoulder 24 away from the second shoulder 25 by axially translating the outer portion 21a of the spindle 21 in a direction away from the second shoulder.

In another embodiment of the present invention (not shown), the friction stir weld device 20 includes means responsive to the measuring means, for axially translating the pin 26 relative to the second end 29b of the first shoulder 24 so as to axially translate the second shoulder 25 toward or away from the workpiece(s) 23 in order to modify the force exerted by the first and second shoulders 24, 25 upon the workpiece(s) and the weld joint 19. The means responsive to the measuring means can include cams and a follower, a power screw, or an actuator assembly, such as one or more pneumatic or hydraulic arms. For example, the assignee of the present application has developed methods and apparatus for controlling the position of a friction stir welding probe, as disclosed in commonly owned U.S. patent application Ser. No. 09/087,416 entitled "Method and Apparatus for Controlling Downforce During Friction Stir Welding" filed on May 29, 1998, the entire disclosure of which is hereby incorporated by reference.

The workpieces 23 joined or welded, according to the present invention, can be formed of either similar or dissimilar metals. Advantageously, since the workpieces 23 are joined by friction stir welding, the workpieces 23 can be formed of dissimilar metals that would be unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits workpieces 23 formed of unweldable materials to be securely joined. Friction stir welding also can be used to securely join weldable materials to other weldable and to unweldable materials. For example, one or both of the workpieces 23 can be formed of aluminum, aluminum alloys, titanium, or titanium alloys. Thus, the materials that form the workpieces 23 can be chosen from a wider variety of light weight, high strength metals and alloys, thereby facilitating reduction of the overall weight of the resulting structural assembly, which is a critical concern in the aerospace industry.

Referring to FIG. 35, there is illustrated a lap joint 56, according to one embodiment of the present invention, formed using the friction stir welding tool 22. Although the friction stir welding tool 22 can be used to form a variety of different types of weld joints, including, but not limited to, butt joints, edge joints, and lap joints, the present invention is particularly useful in forming lap joints and edge joints formed of two or more workpieces or structural members 23a, 23b that have different solidus temperatures. As illustrated in FIG. 35, the second structural member 23b at least partially overlaps the first structural member 23a so as to define an interface 57 therebetween. The lap joint 56 includes a friction stir weld joint 58 joining the first and second structural members 23a, 23b at least partially at the interface 57. The friction stir weld joint 58 defines first and second portions 58a, 58b. The first portion 58a of the friction stir weld joint 58 is mixed by the friction stir weld tool 22 and, more specifically, the surface 45 of the second shoulder 25, at a first angular velocity, and the second portion 58b of the friction stir weld joint 58 is mixed by the friction stir welding tool 22 and, more specifically, the surface 35 of the first shoulder 24, at a second angular velocity to thereby form grain structures of different refinement in the first and second portions 58a, 58b. As used herein, "angular velocity" includes both a speed component and a direction component. The direction component is positive for motion following the "right hand rule," i.e., counter-clockwise motion, and is negative for motion in the opposite direction, i.e., clockwise motion.

Advantageously, because the surfaces 35, 45 of the first and second shoulders 24, 25 can be rotated at different angular velocities when forming the weldjoint 19, the materials used to construct the first and second structural members 23a, 23b can comprise not only dissimilar metals, but materials that have different solidus temperatures, as well as different hardnesses, thus further expanding the range of materials that can be used to construct the resulting structural assembly.

Figure 36:
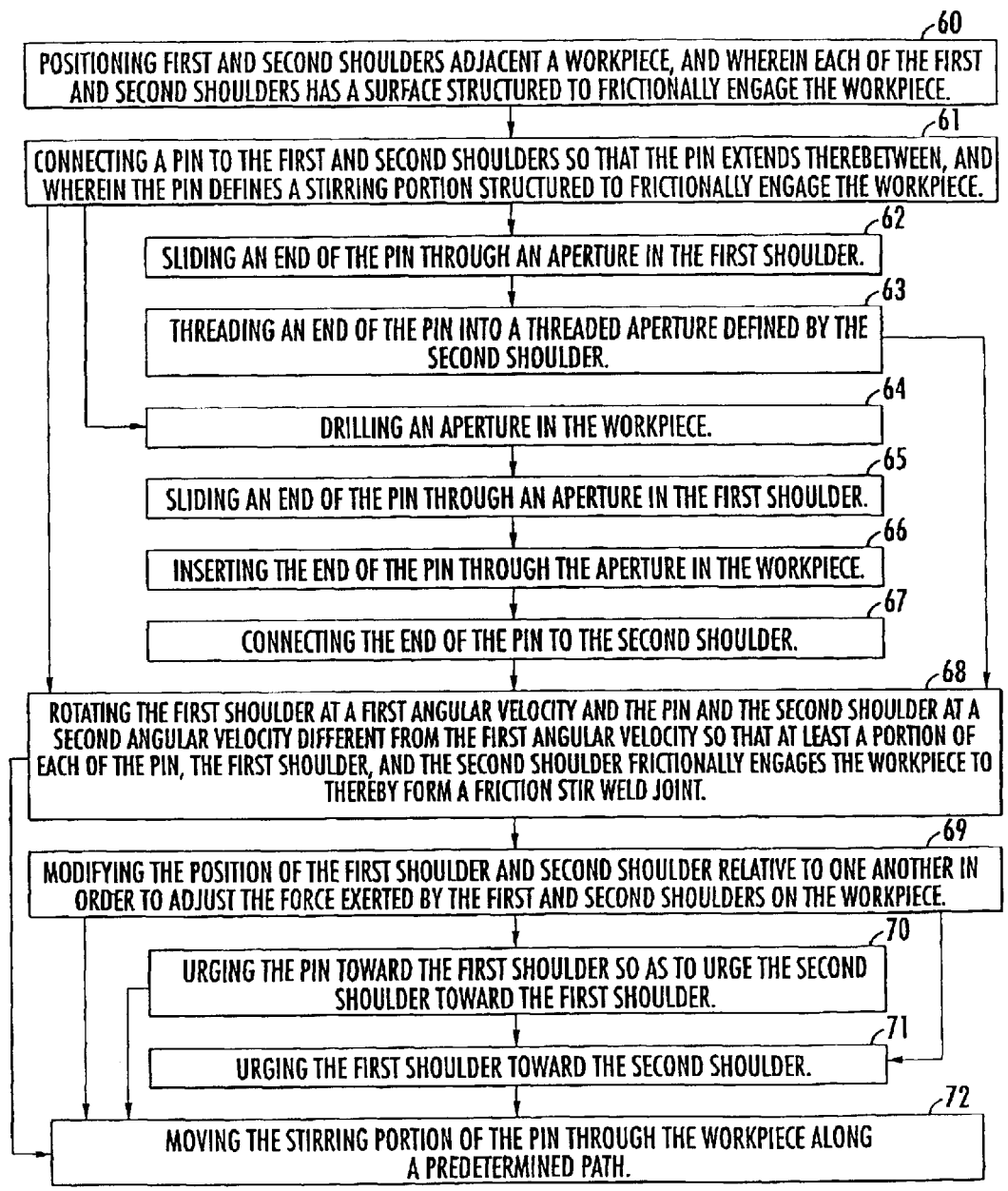
FIG. 36 is a flow chart illustrating the operations for friction stir welding, according to one embodiment of the present invention.

Referring to FIG. 36, there are illustrated the operations performed for friction stir welding a workpiece or workpieces 23 using the friction stir welding device 20, according to one embodiment of the present invention. The method includes positioning first and second shoulders adjacent the workpiece. See Block 60. Each of the first and second shoulders has a surface structured to frictionally engage the workpiece. A pin is connected to the first and second shoulders so that the pin extends therebetween. See Block 61. The pin defines a stirring portion structured to frictionally engage the workpiece. Thereafter, the first shoulder is rotated at a first angular velocity and the pin and the second shoulder are rotated at a second angular velocity different from the first angular velocity so that at least a portion of each of the pin, the first shoulder, and the second shoulder frictionally engages the workpiece to thereby form a friction stir weld joint. See Block 68. The stirring portion of the pin can be moved through the workpiece along a predetermined path. See Block 72.

Figure 37:
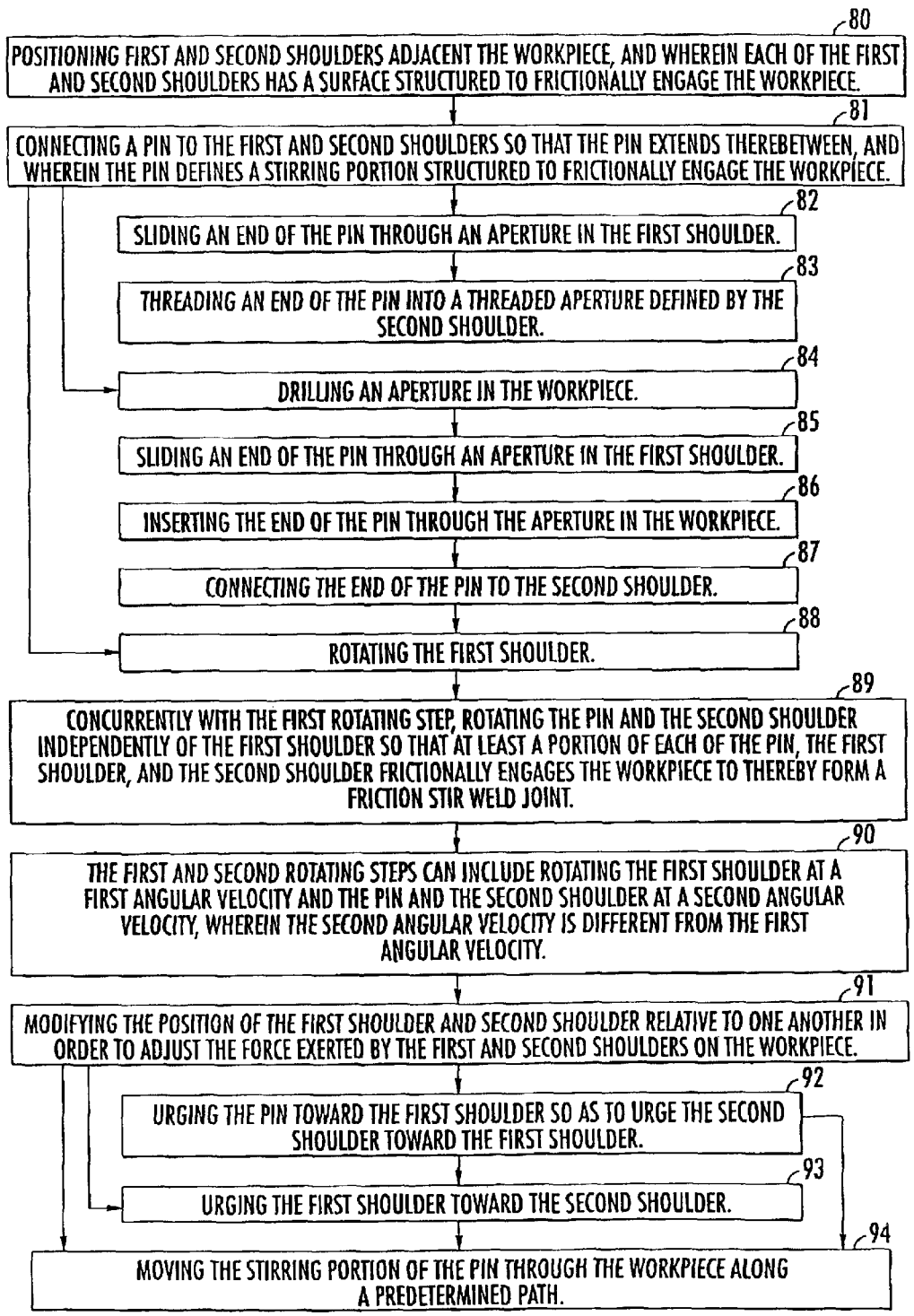
FIG. 37 is a flow chart illustrating the operations for friction stir welding, according to one embodiment of the present invention

Referring to FIG. 37, there are illustrated the operations performed for friction stir welding a workpiece or workpieces 23 using the friction stir welding device 20, according to another embodiment of the present invention. The method includes positioning first and second shoulders adjacent the workpiece. See Block 80. Each of the first and second shoulders has a surface structured to frictionally engage the workpiece. A pin is connected to the first and second shoulders so that the pin extends therebetween. See Block 81. The pin defines a stirring portion structured to frictionally engage the workpiece. The first shoulder is rotated. See Block 88. Concurrently with the first rotating step, the pin and the second shoulder are rotated independently of the first shoulder so that at least a portion of each of the pin, the first shoulder, and the second shoulder frictionally engages the workpiece to thereby form a friction stir weld joint See Block 89. For example, the first and second rotating steps can include rotating the first and second shoulders at the same angular velocity. In another embodiment, the first and second rotating steps include rotating the first shoulder a first angular velocity and the pin and the second shoulder at a second angular velocity, wherein the second angular velocity is different from the first angular velocity. See Block 90. As used herein, "angular velocity" includes both a speed component and a direction component. The direction component is positive for motion following the "right hand rule," i.e., counter-clockwise motion and is negative for motion in the opposite direction, i.e., clockwise motion. The stirring portion of the pin can be moved through the workpiece along a predetermined path. See Block 94.

As illustrated in FIGS. 36 and 37, the method of connecting the pin to the first and second shoulders can be varied. In one embodiment, the connecting step comprises sliding an end of the pin through an aperture in the first shoulder. See Blocks 62 and 82. The connecting step can then include threading an end of the pin into a threaded aperture defined by the second shoulder. See Blocks 63 and 83. In another embodiment, the connecting step comprises drilling an aperture in the workpiece. See Blocks 64 and 84. An end of the pin is slid through an aperture in the first shoulder. See Blocks 65 and 85. The end of the pin is inserted through the aperture in the workpiece and connected to the second shoulder. See Blocks 66 and 86. The end of the pin is then connected to the second shoulder. See Blocks 67 and 87.

As illustrated in FIGS. 36 and 37, the position of the first and second shoulders relative to one another can be modified in order to adjust the force exerted by the shoulders on the workpiece. See Blocks 69 and 91. For example, in one embodiment, the pin is urged toward the first shoulder so as to urge the second shoulder toward the first shoulder. See Blocks 70 and 92. In another embodiment, the first shoulder is urged toward the second shoulder. See Blocks 71 and 93.

Accordingly, there has been provided a friction stir welding tool, apparatus and associated method of manufacture for forming weld joints by friction stir welding large workpieces or workpieces having curvilinear geometries. The tool is capable of effectively supporting a weld joint and constraining the plasticized material within the weld joint during friction stir welding. T he tool can easily be adapted to varying workpiece geometries and sizes. In addition, the tool allows for friction stir welding workpieces having different material properties.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A friction stir weld lap joint being formed by a rotating fiction stir welding tool, comprising:
   a first structural member;
   a second structural member, said second structural member at least partially overlapping said first structural member so as to define an interface therebetween; and
   a fiction stir weld joint joining said first and second structural members at least partially at said interface, said friction stir weld joint defining first and second portions, said first portion comprising the surface of said first structural member opposite said interface, said first portion being mixed by the friction stir weld tool at a first angular velocity, said second portion comprising at least a portion of said first structural member adjacent said interface and at least a portion of said second structural member, said second portion being mixed by the friction stir welding tool at a second angular velocity to thereby form grain structures of different refinement in said first and second portions.

2. A friction stir weld lap joint according to claim 1 wherein said first and second structural members comprise different materials.

3. A friction stir weld lap joint according to claim 1 wherein said first and second structural members have different melting temperatures.

4. A friction stir weld lap joint according to claim 1 wherein said first and second structural members have different hardness.

5. A friction stir weld lap joint joining first and second workpieces, the joint extending through the interface defined by the first and second workpieces and having first and second portions, wherein the first portion comprises the surface of the first workpieces opposite the interface, the first portion is mixed at a first angular velocity, and the second portion comprises at least a portion of the first structural member adjacent the interface and at least a portion of the second structural member, the second portion is mixed at a second angular velocity, the joint being formed by a process comprising the steps of:
   positioning a first shoulder adjacent the first workpiece and positioning a second shoulders adjacent second workpiece, each of the first and second shoulders having a surface structured to frictionally engage the corresponding workpiece;
   connecting a pin to the first and second shoulders so that the pin extends therebetween, the pin defining a stirring portion structured to frictionally engage the first and second workpieces; and
   thereafter, rotating the first shoulder at a first angular velocity and the pin and the second shoulder at a second angular velocity different from the first angular velocity so that at least a portion of each of the pin, and the first shoulder frictionally engage the first workpiece, and at least a portion of each of the pin and the second shoulder frictionally engages the second workpiece to thereby form the friction stir weld joint.

6. A friction stir weld joint being formed according to the process of claim 5 wherein said connecting step comprises sliding an end of the pin through an aperture in the first shoulder.

7. A friction stir weld joint being formed according to the process of claim 5 wherein said connecting step comprises threading an end of the pin into a threaded aperture defined by the second shoulder.

8. A friction stir weld joint being formed according to the process of claim 5 wherein said connecting step comprises:
   drilling an aperture in the first and second workpieces;
   sliding an end of the pin through an aperture in the first shoulder;
   inserting the end of the pin through the aperture in the first and second workpieces; and
   connecting the end of the pin to the second shoulder.

9. A friction stir weld joint being formed according to the process of claim 5 further comprising moving the stirring portion of the pin through the first and second workpieces along a predetermined path.

10. A friction stir weld joint being formed according to the process of claim 5 further comprising urging the pin toward first shoulder so as to urge the second shoulder toward the first shoulder.

11. A friction stir weld lap joint joining first and second workpieces, the joint extending through the interface defined by the first and second workpieces in a direction substantially perpendicular to the interface and having first and second portions, wherein the first portion comprises the surface of the first workpiece opposite the interface, the first portion is mixed at a first angular velocity, and the second portion comprises at least a portion of the first structural member adjacent the interface and at least a portion of the second structural member, the second portion is mixed at a second angular velocity, the joint being formed by a process comprising the steps of:
   positioning a first shoulder adjacent the first workpiece and positioning a second shoulders adjacent second workpiece, each of the first and second shoulders having a surface structured to frictionally engage the corresponding workpiece;
   connecting a pin to the first and second shoulders so that the pin extends therebetween, the pin defining a stirring portion structured to frictionally engage the first and second workpieces;
   rotating the first shoulder at a first angular velocity; and
   concurrently with said fist rotating step, rotating the pin and the second shoulder independently of the first shoulder at a second angular velocity so that at least a portion of each of the pin and the first shoulder frictionally engages the first workpiece, and at least a portion of each of the pin and the second shoulder fictionally engages the second workpiece to thereby form the friction stir weld joint.

12. A friction stir weld joint being formed according to the process of claim 11 wherein said connecting step comprises sliding an end of the pin through an aperture in the first shoulder.

13. A friction stir weld joint being formed according to the process of claim 11 wherein said connecting step comprises threading an end of the pin into a threaded aperture defined by the second shoulder.

14. A friction stir weld joint being formed according to the process of claim 11 wherein said connecting step comprises:
    drilling an aperture in the first and second workpieces;
    sliding an end of the pin through an aperture in the first shoulder;
    inserting the end of the pin through the aperture in the first and second workpieces; and
    connecting the end of the pin to the second shoulder.

15. A friction stir weld joint being formed according to the process of claim 11 further comprising moving the stirring portion of the pin through the first and second workpieces along a predetermined path.

16. A friction stir weld joint being formed according to the process of claim 11 further comprising urging the pin toward the first shoulder so as to urge the second shoulder toward the first shoulder.

17. A friction stir weld joint being formed according to the process of claim 11 wherein said first and second rotating steps comprise rotating the first shoulder at a first angular velocity and the pin and the second shoulder at a second angular velocity, the second angular velocity being different from the first angular velocity.

* * * * *